(12) United States Patent  
Kim et al.

(10) Patent No.: US 7,633,595 B2  
(45) Date of Patent: Dec. 15, 2009

(54) LIQUID CRYSTAL DISPLAY PANEL HAVING DUMMY COLOR FILTER AND FABRICATING METHOD THEREOF

(75) Inventors: Woong-Kwon Kim, Gyeonggi-do (KR); Seung-Ryul Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 310 days.

(21) Appl. No.: 11/019,625

(22) Filed: Dec. 23, 2004

(65) Prior Publication Data

US 2005/0140892 A1 Jun. 30, 2005

(30) Foreign Application Priority Data

Dec. 30, 2003 (KR) .................. 10-2003-0099811

(51) Int. Cl.
- *G02F 1/1339* (2006.01)
- *G02F 1/1335* (2006.01)
- *G02F 1/1333* (2006.01)

(52) U.S. Cl. ............... 349/156; 349/106; 349/110; 349/129; 349/155; 349/187

(58) Field of Classification Search .......... 349/155–157  
See application file for complete search history.

(56) References Cited

U.S. PATENT DOCUMENTS

| | | | |
|---|---|---|---|
| 6,356,330 B1 * | 3/2002 | Ando et al. ............... 349/141 |
| 6,493,050 B1 * | 12/2002 | Lien et al. .................. 349/106 |
| 6,577,374 B1 * | 6/2003 | Nakata et al. .............. 349/156 |
| 6,693,697 B2 * | 2/2004 | Sakamoto et al. .......... 349/138 |
| 7,312,840 B1 * | 12/2007 | Sakamoto ................... 349/106 |
| 2004/0174476 A1 * | 9/2004 | Yeh et al. .................... 349/110 |

FOREIGN PATENT DOCUMENTS

| CN | 1264844 | 8/2000 |
| JP | 10068956 A * | 3/1998 |

OTHER PUBLICATIONS

Machine translation of JP 10-68956.*

* cited by examiner

*Primary Examiner*—Andrew Schechter  
(74) *Attorney, Agent, or Firm*—McKenna Long & Aldridge LLP

(57) ABSTRACT

A liquid crystal display includes a gate line disposed on a substrate; a data line disposed on the substrate, a pixel area being defined by an intersection of the gate line and the data line; a thin film transistor locating at the intersection of the gate line and the data line; a color filter disposed at each pixel area on the substrate; a spacer formed on a first base surface of the thin film transistor area; a rib formed on a second base surface of the pixel area; and a dummy pattern disposed at the thin film transistor area to form a stepped difference of the first base surface and the second base surface.

8 Claims, 21 Drawing Sheets

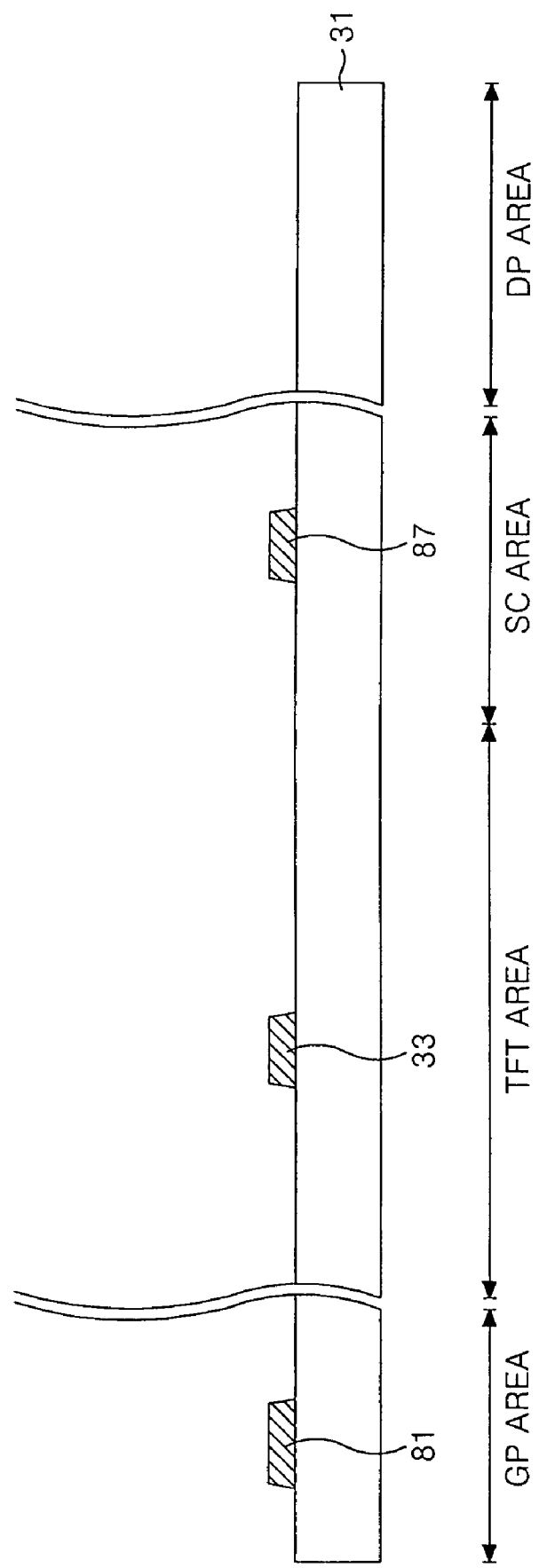

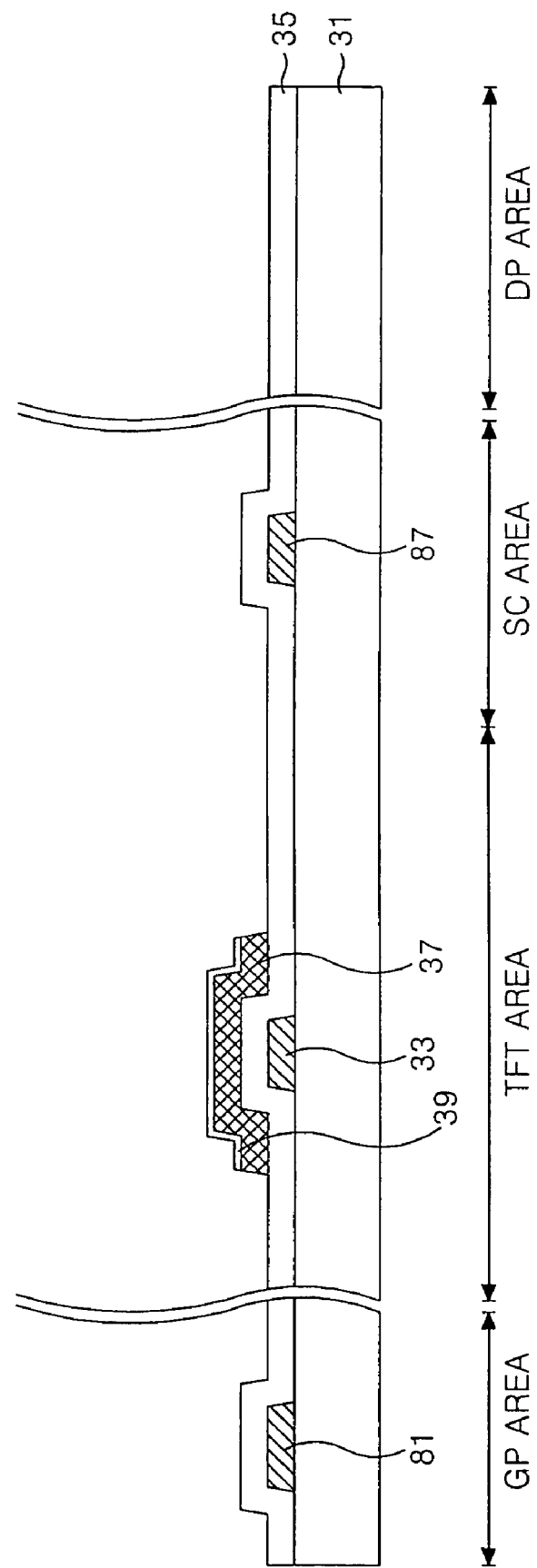

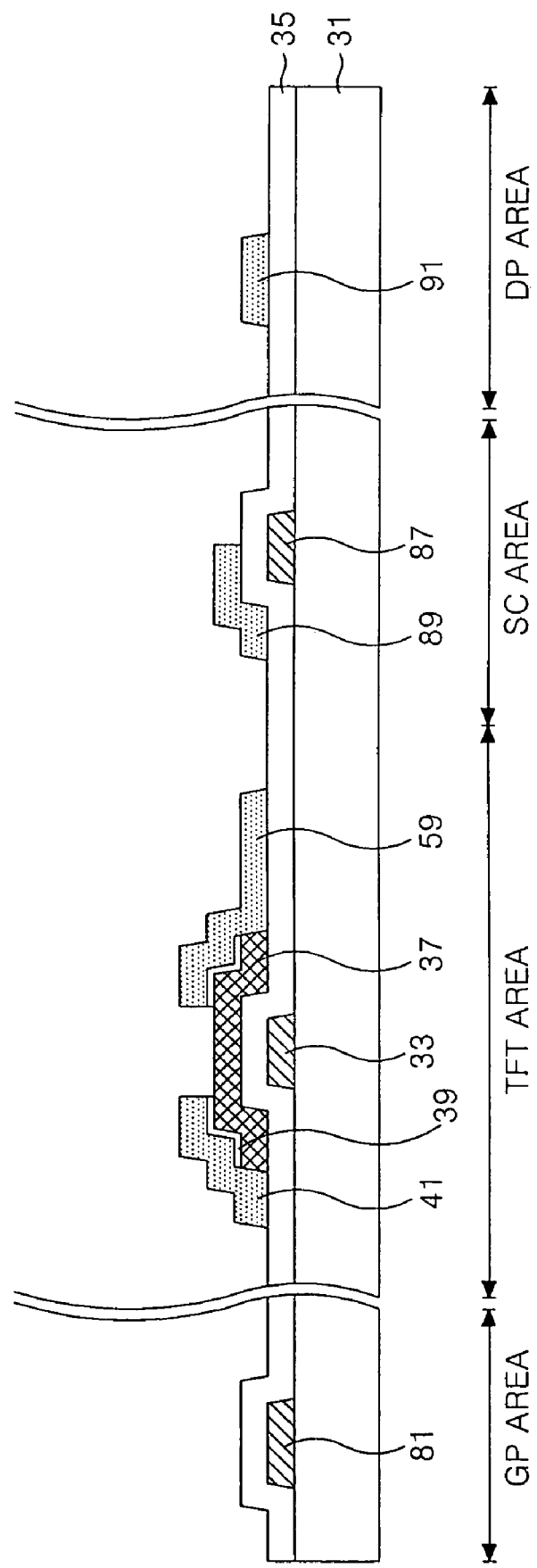

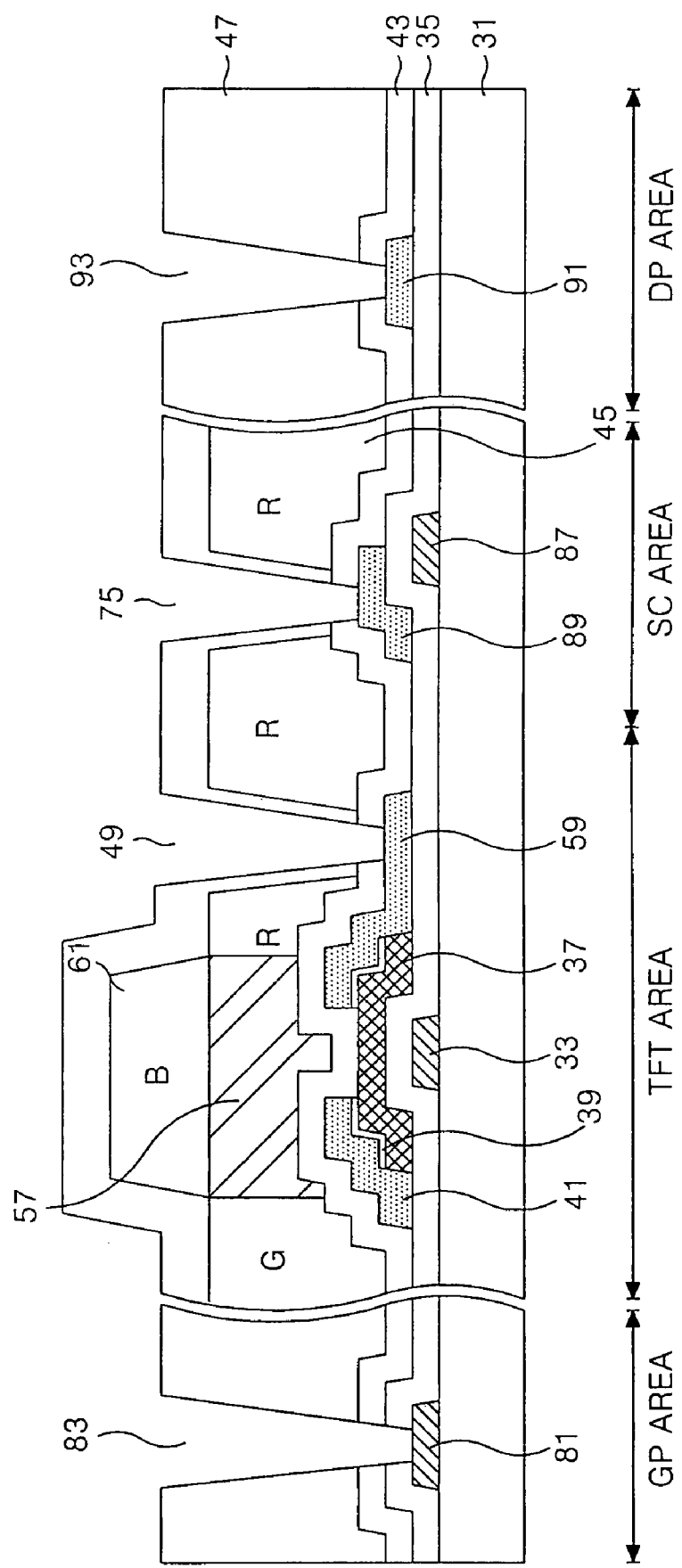

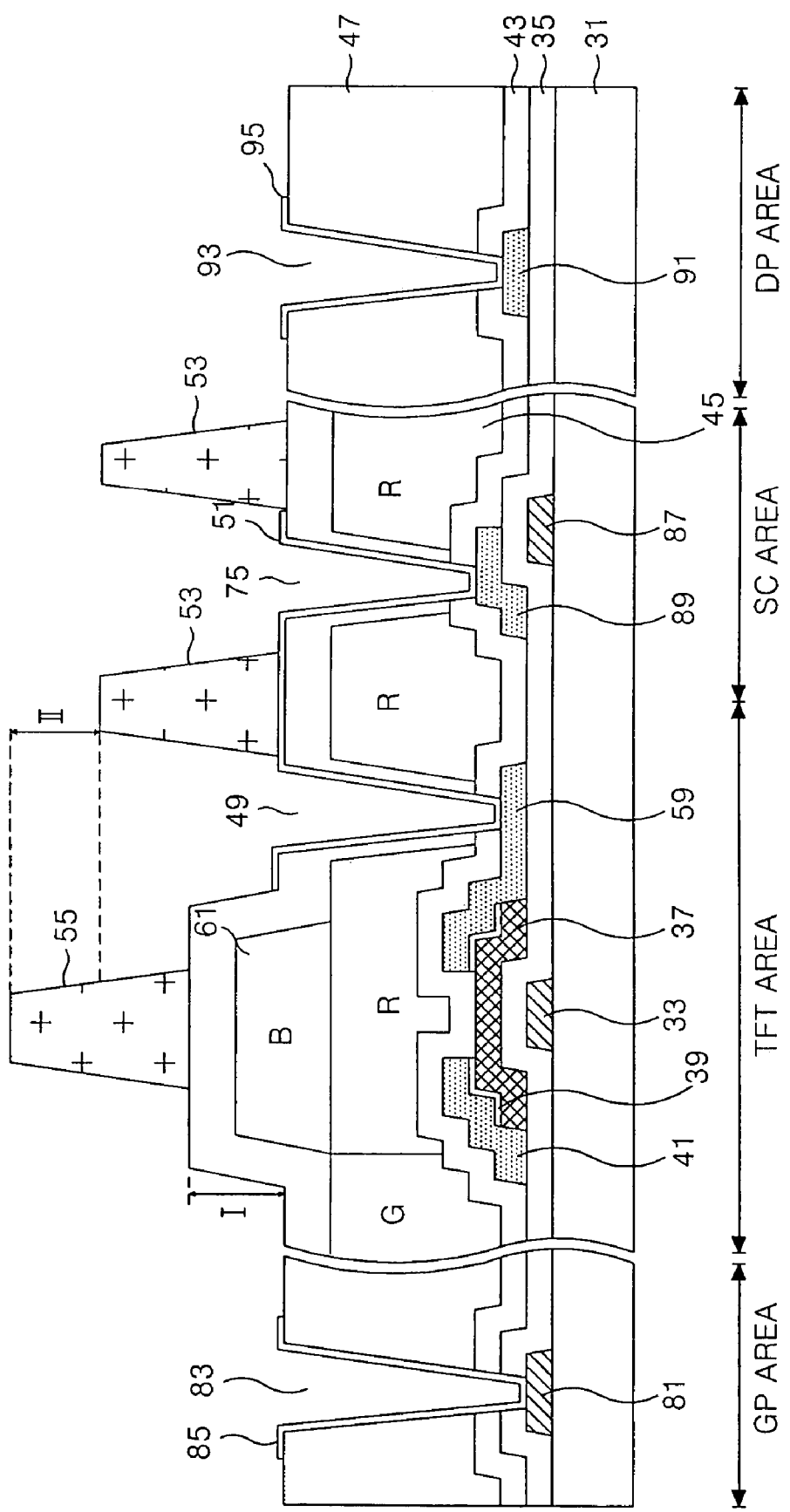

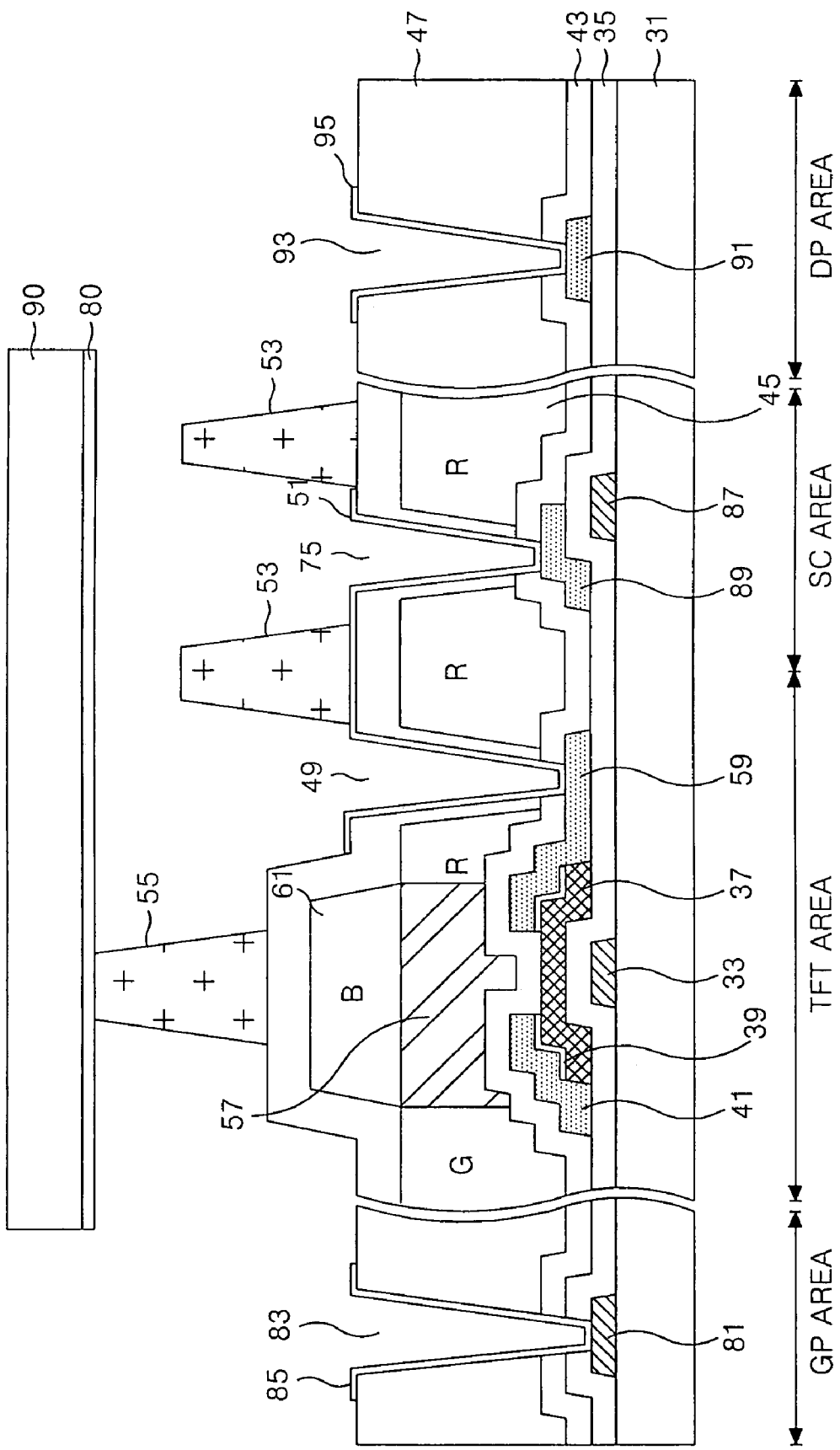

LIQUID CRYSTAL DISPLAY PANEL HAVING DUMMY COLOR FILTER AND FABRICATING METHOD THEREOF

This application claims the benefit of Korean Patent Application No. 2003-0099811 filed in Korea on Dec. 30, 2003, which is hereby incorporated by reference.

BACKGROUND OF THE INVENTION

1. Field of the Invention

The present invention relates to a liquid crystal display, and more particularly, to a liquid crystal display for realizing an increased viewing angle by dividing the arrangement direction of liquid crystal material in a pixel area, and a fabricating method thereof.

2. Discussion of the Related Art

Liquid crystal display (LCD) devices have many advantageous characteristics including low voltage drive, low power consumption, short response time, small size, light weight, small thickness, full color image display and others characteristics. Thus, application of the LCD devices in various types of consumer electronics, from a watch, a calculator, a PC monitor, a notebook, a PDA, an aeronautical monitor, a TV, a mobile phone and other electronics is increasing. Generally, the liquid crystal display devices are classified into a twisted nematic TN type liquid crystal display device, an IPS type liquid crystal display device, and a vertical alignment VA type liquid crystal display device in accordance with the arrangement shape of liquid crystal materials.

The liquid crystal materials used in the TN type liquid crystal display device has a twisted shape arranged in spiral orientation. The spiral orientation further includes that the liquid crystal material is disposed in parallel and having the regular interval with each other. The major axis of the liquid crystal material is arranged to change continuously. And visual characteristic is determined in accordance with the arrangement of the major axis and minor axis of the liquid crystal material. However, the TN type liquid crystal display device has a poor comparison ratio because light is not completely shut off at an off state. In addition, the comparison ratio changes with angles, and the brightness of middle scale reverses with change in the comparison ratio, thus, it is difficult to obtain a stable picture. Furthermore, the poor comparison ratio causes a viewing-angle problem such that the picture quality is not symmetric to the front surface.

On the other hand, the VA liquid crystal display device has the liquid crystal materials arranged vertically to the substrate surface in a voltage-absent state. The liquid crystal materials are aligned in several directions when the voltage is applied to show various characteristics such as improved comparison ratio and faster response speed. In addition, when the direction of the alignment of the liquid crystal materials is divided into designated several directions and a compensation film is used, the increased viewing angle might be realized effectively.

Recently, in the VA liquid crystal display device, a method of forming a rib defined as a triangle protrusion on the substrate inducing an electric field is suggested. In this method, the liquid crystal material has a negative dielectric anisotropy surrounded by a vertical alignment film along the induced electric field, or an aperture pattern is formed in a transparent electrode. Accordingly, the alignment of the liquid crystal material is controlled. At this moment, a shape of a 4 division alignment pattern used in the rib or the aperture pattern indicates the maximum efficiency in light utilization.

The VA liquid crystal display device, where the alignment of the liquid crystal materials is controlled by the rib of the related art method, forms a thin film transistor and a pixel electrode on a lower substrate. The rib is formed of an organic photosensitive insulating material on the pixel electrode. In addition, when the voltage is applied between the pixel electrode and a common electrode formed on an upper substrate, an electric field distortion is generated by the rib. And, arrangement of the liquid crystal material is changed having the rib at its center. As a result, a multi-domain is formed within the liquid crystal cell, and therefore, the viewing angle is increased.

However, the liquid crystal display of the related art requires the rib formed by a separate mask process and complicates the production process of the liquid crystal display device.

SUMMARY OF THE INVENTION

Accordingly, the present invention is directed to a liquid crystal display and fabrication method thereof that substantially obviates one or more of the problems due to limitations and disadvantages of the related art.

An object of the present invention is to provide a liquid crystal display device implemented with the rib to increase the viewing angle, and method of fabricating the same.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display includes a gate line disposed on a substrate; a data line disposed on the substrate, a pixel area being defined by an intersection of the gate line and the data line; a thin film transistor locating at the intersection of the gate line and the data line; a color filter disposed at each pixel area on the substrate; a spacer formed on a first base surface of the thin film transistor area; a rib formed on a second base surface of the pixel area; and a dummy pattern disposed at the thin film transistor area to form a stepped difference of the first base surface and the second base surface.

In another aspect, a fabricating method of a liquid crystal display includes the steps of forming a thin film transistor on a substrate; disposing a first protective film to protect the thin film transistor; forming a light shielding layer on the first protective film, wherein the light shielding layer overlaps the thin film transistor; forming a color filter on the first protective film where the light shielding layer is formed, and forming a dummy pattern on the light shielding layer; forming a pixel electrode connected to the thin film transistor; and forming a spacer on the dummy pattern and a rib on the color filter simultaneously, wherein the rib controls the arrangement direction of a liquid crystal material.

In another aspect, the fabricating method of a liquid crystal display includes the steps of forming a thin film transistor on a substrate; disposing a first protective film to protect the thin film transistor; forming a color filter on the first protective film; forming a dummy pattern to overlap the thin film transistor on the color filter; forming a pixel electrode connected to the thin film transistor; and forming a spacer on the dummy pattern and a rib on the color filter simultaneously, wherein the rib controls the arrangement direction of a liquid crystal material.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specifications, illustrate embodiments of the invention and together with the description serve to explain the principles of the invention. In the drawings:

FIGS. 2A to 2H are cross-sectional views representing a fabricating method of the lower array substrate of the liquid crystal display device of FIG. 1;

FIG. 5 is a cross-sectional view representing a lower array substrate of a liquid crystal display device according to a third exemplary embodiment of the present invention;

FIG. 8 is a cross-sectional view representing a liquid crystal display device including the lower array substrate according to the first to third exemplary embodiments of the present invention.

DETAILED DESCRIPTION OF THE PREFERRED EMBODIMENTS

Reference will now be made in detail to the preferred embodiments of the present invention, examples of which are illustrated in the accompanying drawings. Hereinafter, the preferred embodiments of the present invention will be described in detail with reference to FIGS. 1 to 9.

Figure 1:
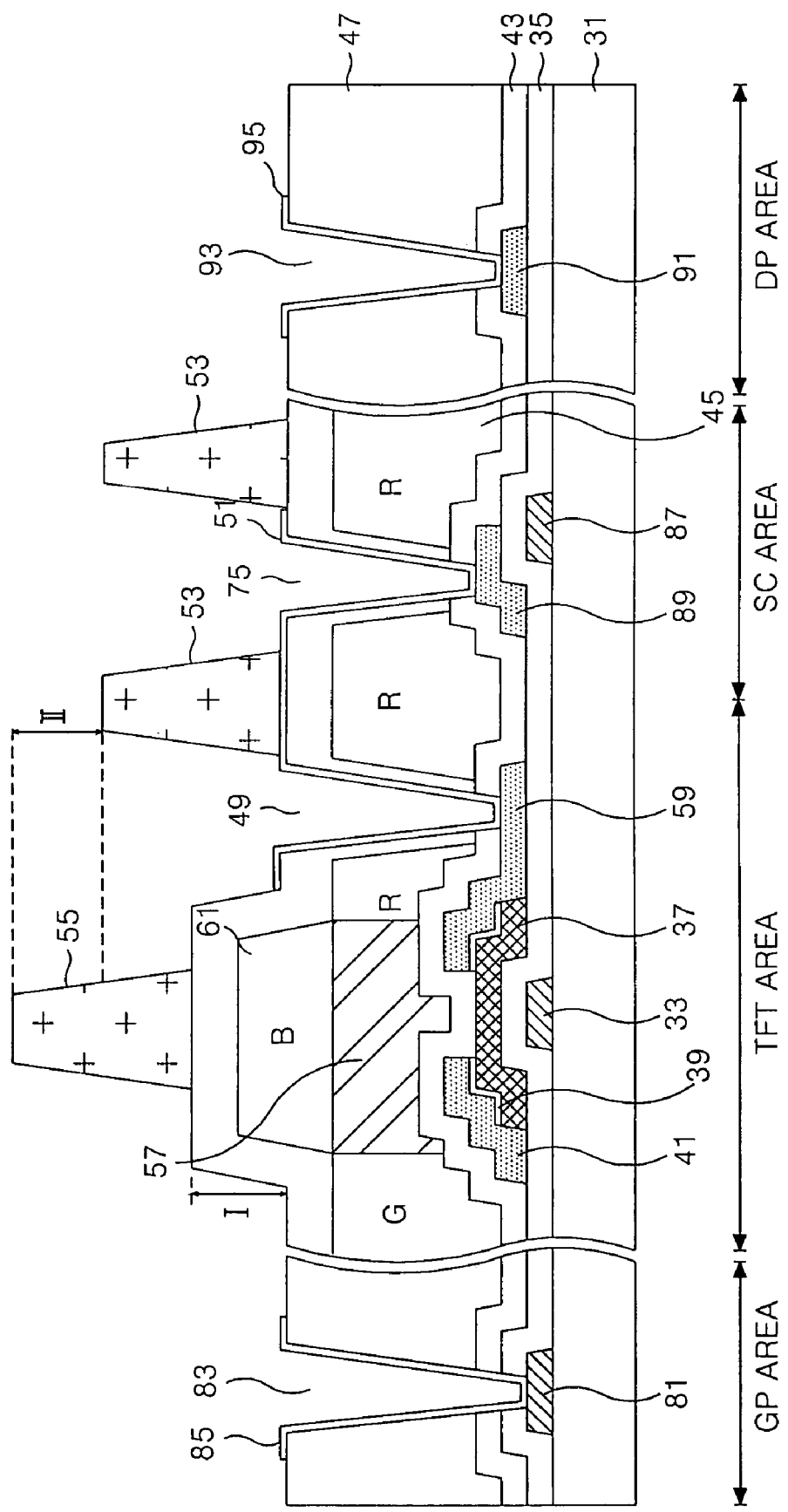
FIG. 1 is a cross-sectional view representing a lower array substrate of a liquid crystal display device according to a first exemplary embodiment of the present invention.

FIG. 1 is a cross-sectional view of a liquid crystal display device according to a first embodiment of the present invention.

A liquid crystal display, as shown in FIG. 1, includes a thin film transistor TFT formed at an intersection of a gate line 87 and a data line, a pixel electrode 51 connected to the thin film transistor, a storage capacitor SC formed at an overlapping area of the gate line 87 and a storage electrode 89, a gate pad connected to the gate line 87, a data pad DP connected to the data line, a spacer 55 to sustain a cell gap, and a rib 53 having the same height as the spacer 55.

The thin film transistor responds to a gate signal from the gate line 87 to charge the pixel electrode 51 with a pixel signal provided from the data line and maintains the preceding pixel signal. To achieve this, the thin film transistor includes a gate electrode 33 connected to the gate line 87, a source electrode 41 connected to the data line, and a drain electrode 59 connected to the pixel electrode 51. Furthermore, the thin film transistor includes an active layer 37 overlapping the gate electrode 33, and a gate insulating film 35 therebetween to form a channel between the source electrode 41 and a drain electrode 59. Moreover, an ohmic contract layer 39 is disposed on the active layer 37 to make ohmic-contact with a source electrode 41 and a drain electrode 59.

A first protective film 43 is disposed to protect the thin film transistor. A light shielding layer 57 formed of an organic insulating material having high resistance to black color is disposed in an area overlapping the thin film transistor on the first protective film 43. The light shielding layer 57 covers the channel portion of the thin film transistor, thereby preventing the generation of light leakage current.

A dummy color filter 61 formed of an identical material as that of any one of red, green and blue color filters 45 is disposed on the light shielding layer 57. The dummy color filter 61 is formed of the identical material as that of the color filter of an adjacent pixel area. The dummy color filter 61 generates a step which is a difference in height of the pixel area and the thin film transistor area.

A color filter 45 is disposed on a first protective film 43 except pad areas where a gate pad GP and a data pad DP are formed. Each color filter 45 includes at least one of red, green, and blue color, and the color filter 45 is sequentially disposed on the first protective film 43. Each color filter 45 corresponds to a respective pixel area.

A second protective film 47 formed of an organic insulating material including acrylic resin or BCB is disposed on the color filter 45. The second protective film 47 prevents the liquid crystal from being contaminated by the color filter 45. A spacer 55 is formed within the area corresponding to a light shielding layer 57 on the second protective film 47, and a rib 53 is formed within the pixel area.

The spacer 55 maintains a desired distance from an upper substrate (not shown) when bonding a lower substrate 31 with the upper substrate. The rib 53 induces an electric field to change the arrangement of the liquid crystal material, thereby improving a viewing angle when the voltage is applied between the pixel electrode 51 on the lower substrate 31, and a common electrode (not shown) disposed on the upper substrate. The rib 53 is formed to be smaller that a cell gap CG to prevent contacting the opposite upper substrate. At this moment, the spacer 55 and the rib 53 are formed to have the identical height (i.e., around 1.5 μm-2.0 μm).

The pixel electrode 51 is disposed at the pixel area defined by intersecting the gate line 87 with the data line. The pixel electrode 51 contacts a drain electrode 59 of the thin film transistor TFT within a first contact hole 49 defined through the first and second protective films 43 and 47. The storage capacitor SC includes the gate line 57, and a storage electrode 89 overlapping the gate line 87 having a gate insulating film 35 therebetween. Herein, the storage electrode 89 is connected to the pixel electrode 51 within a second contact hole 75 defined through the first and second protective films 43 and 47. The storage capacitor SC is kept stable until a next pixel signal is provided to charge the pixel electrode with new value.

The gate pad GP is connected to a gate driver (not shown) to supply a gate signal to the gate line 87. The gate pad GP includes a gate pad lower electrode 81 extended from the gate line 87, and a gate pad upper electrode 85 connected to the gate pad lower electrode 81 within a third contact hole 83 defined through the gate insulating film 35, and the first and second protective films 43 and 47. The data pad DP is connected to a data driver (not shown) to supply a data signal to the data line. The data pad DP include a data pad lower electrode 91 extended from the data line, and a data pad upper electrode 95 connected to the data pad lower electrode 91 within a fourth contact hole 93 defined through the first and second protective films 43 and 47.

The liquid crystal display device according to the first exemplary embodiment of the present invention includes first stepped difference I and second stepped difference II defined by the second protective film 47. The first stepped difference I is defined as height of the protruding portion of the second protective film 47 covering the dummy color filter 61. The second stepped difference II is defined as a difference in height of the spacer 55 and the rib 53. The first and second stepped differences I, II controls the thickness of an organic insulating material forming the spacer 55 and the rib 53. Accordingly, the first stepped difference I is formed higher than or equal to the second stepped difference II, or the first stepped difference I is formed proportional to the second stepped difference II (I∝II).

If the height of the rib 53 is higher, an alignment defect and a light leakage can be generated, thus the second stepped difference II is increased. On the other hand, when the first and second stepped differences I, II are having heights proportional to each other, the first stepped difference I is increased to reduce the height of the rib (=the cell gap−the second stepped difference).

The liquid crystal display according to the first exemplary embodiment of the present invention is implemented to form the stepped difference by the dummy color filter and the spacer at the upper portion of the thin film transistor, and by the rib at the upper portion of the pixel are simultaneously, thereby simplifying the process.

FIGS. 2A to 2H are cross-sectional views representing a thin film transistor array substrate of FIG. 1.

As shown in FIG. 2A, a gate metal layer formed from aluminum group metal or copper is disposed on the transparent lower substrate 31 and patterned by photolithography, thereby forming a first conductive pattern group including the gate electrode 33, the gate line 87 and the gate pad lower electrode 81, Then, as shown in FIG. 2B an inorganic insulating material such as silicon nitride or silicon oxide oxidized film is disposed as the gate insulating film 35 on the entire surface of the lower substrate 31 to cover the first conductive pattern group. An amorphous silicon layer and an impurities-doped amorphous silicon layer are disposed on a portion of the gate insulating film 35, patterned by photolithography, thereby forming a semiconductor pattern including the active layer 37 and an ohmic contact layer 39, respectively.

As shown in FIG. 2C, a data metal layer formed from chrome Cr, molybdenum Mo or copper Cu is disposed on a portion where the semiconductor pattern is formed. Thereafter, the data metal layer is patterned by photolithography, and forming a second conductive pattern group including a source electrode 41, a drain electrode 59, a storage electrode 89 and the data pad lower electrode 91. And then, the ohmic contact layer 39 corresponding to the channel portion of the thin film transistor is etched to expose the active layer 37, the source electrode 41 and the drain electrode 59.

Figure 2D:
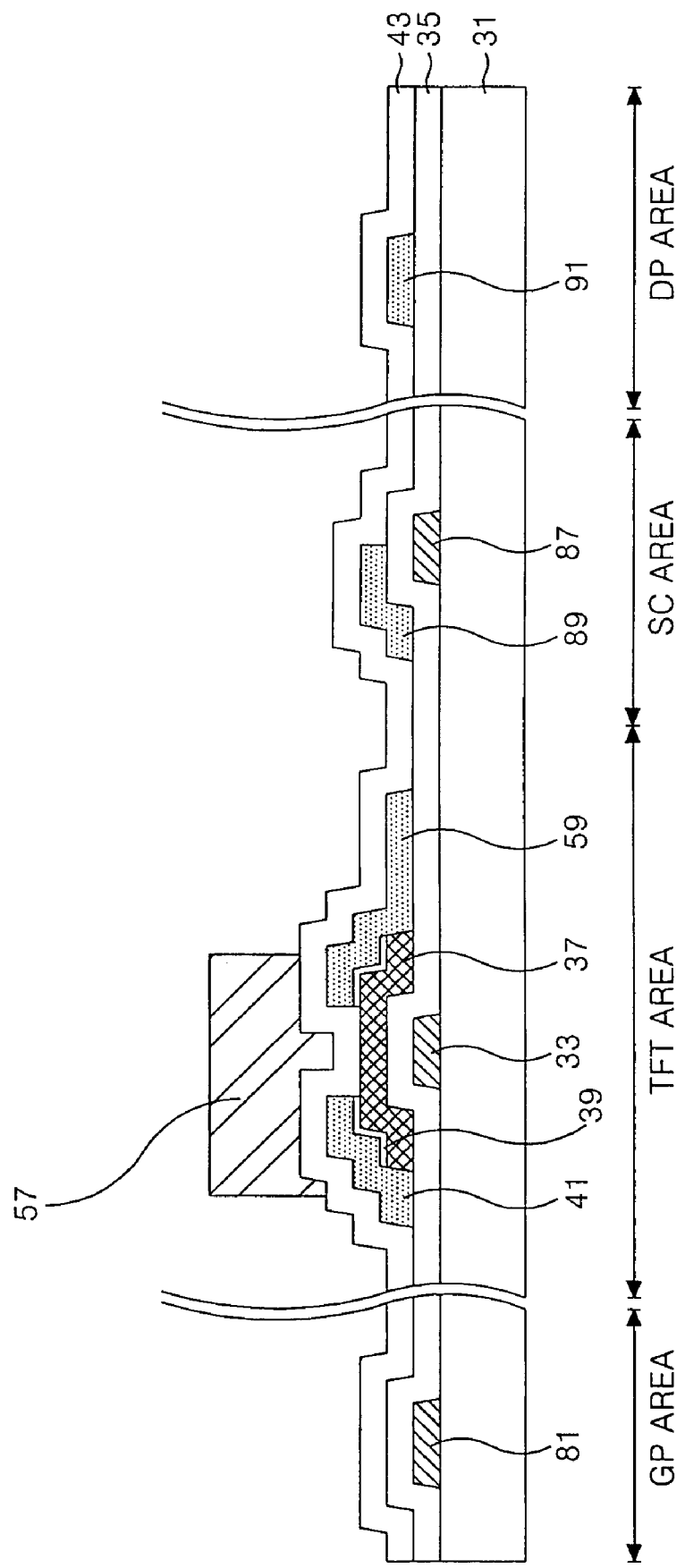

As shown in FIG. 2D, an inorganic insulating material such as silicon nitride or silicon oxide is disposed as the first protective film 43 on the gate insulating film 35 where the second conductive pattern group is formed. A black resin having a high electrical resistivity is disposed over the first protective film 43 and patterned by exposing and developing to form a light shielding layer 57. The light shielding layer 57 prevents a light leakage current from being generated by shutting off light incident on the channel portion of the thin film transistor. Herein, the black resin with high electrical resistivity is a material of around 1010 Ωcm or above.

Figure 2E:
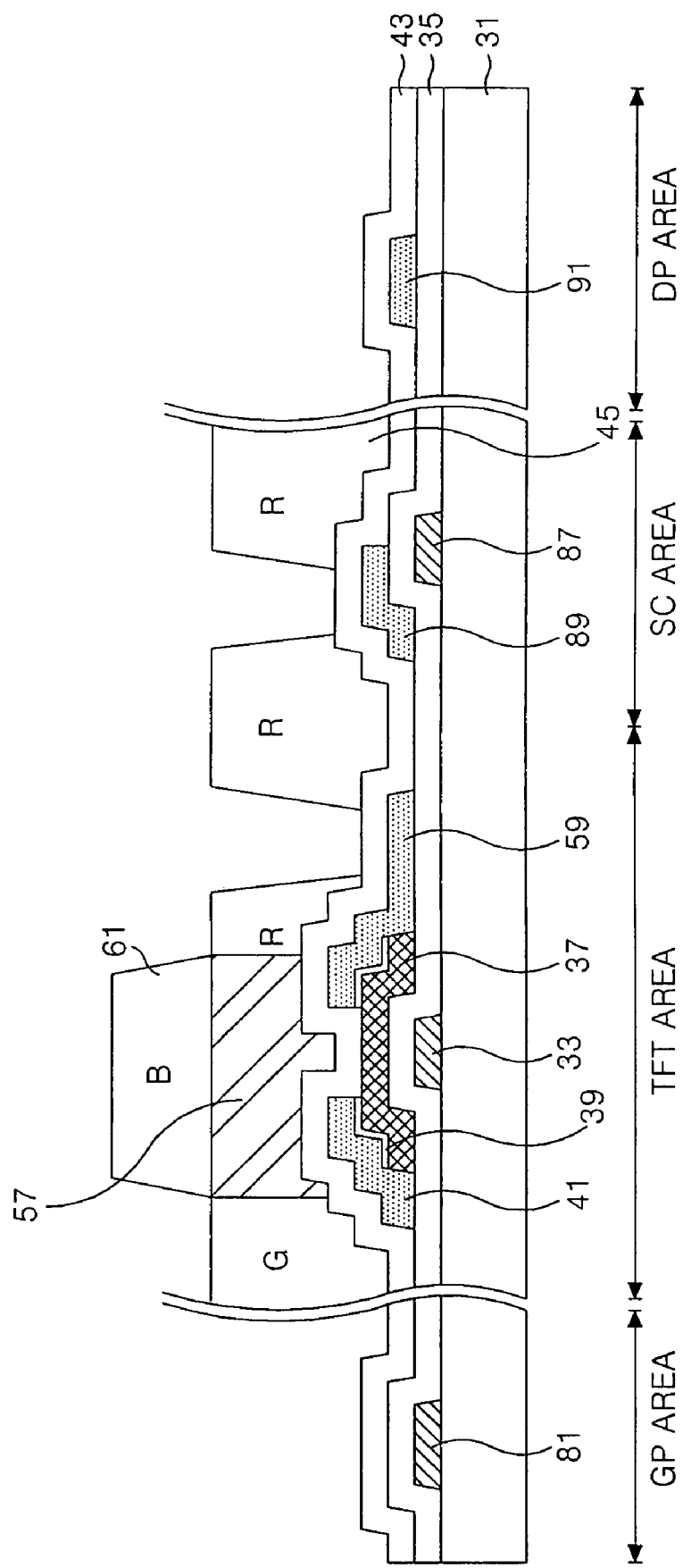

As shown in FIG. 2E, a photo-sensitive material that can filter any one of red R, green G and blue B, is disposed on the first protective film 43 to cover the light shielding layer 57. The photosensitive material is then pattern by exposure and development to form a color filter 45 and a dummy color filter 61. The dummy color filter 61 are formed within the TFT area. The color filter 45 is made of respective one of red, green and blue, accordingly, a disposing process, an exposure process and a development process are repeated three times to form the color filter 45 that realizes each color. At this moment, no color filter 45 is formed within the area corresponding to the drain electrode 59.

As shown in FIG. 2F, an organic insulating film including acrylic resin or BCB is disposed on the color filter 45 and the dummy color filter 61, thereby forming the second protective film 47. The second protective film 47 and the first protective film 43 are sequentially patterned by photolithography to define first to fourth contact holes 49, 75, 83, 93, respectively. The first and second contact holes 49, 75 are defined such that the light shielding layer 57 and the color filter 45 are not exposed. Herein, the first contact hole 49 penetrates through the first and second protective films 43 and 47 to expose the drain electrode 59 of the thin film transistor, the second contact hole 75 penetrates through the first and second protective films 43 and 47 to expose the storage electrode 89, the third contact hole 83 penetrates through the gate insulating film 35 and the first and second protective films 43 and 47 to expose the gate pad lower electrode 81, and the fourth contact hole 93 penetrates through the first and second protective films 43 and 47 to expose the data pad lower electrode 91.

Figure 2G:
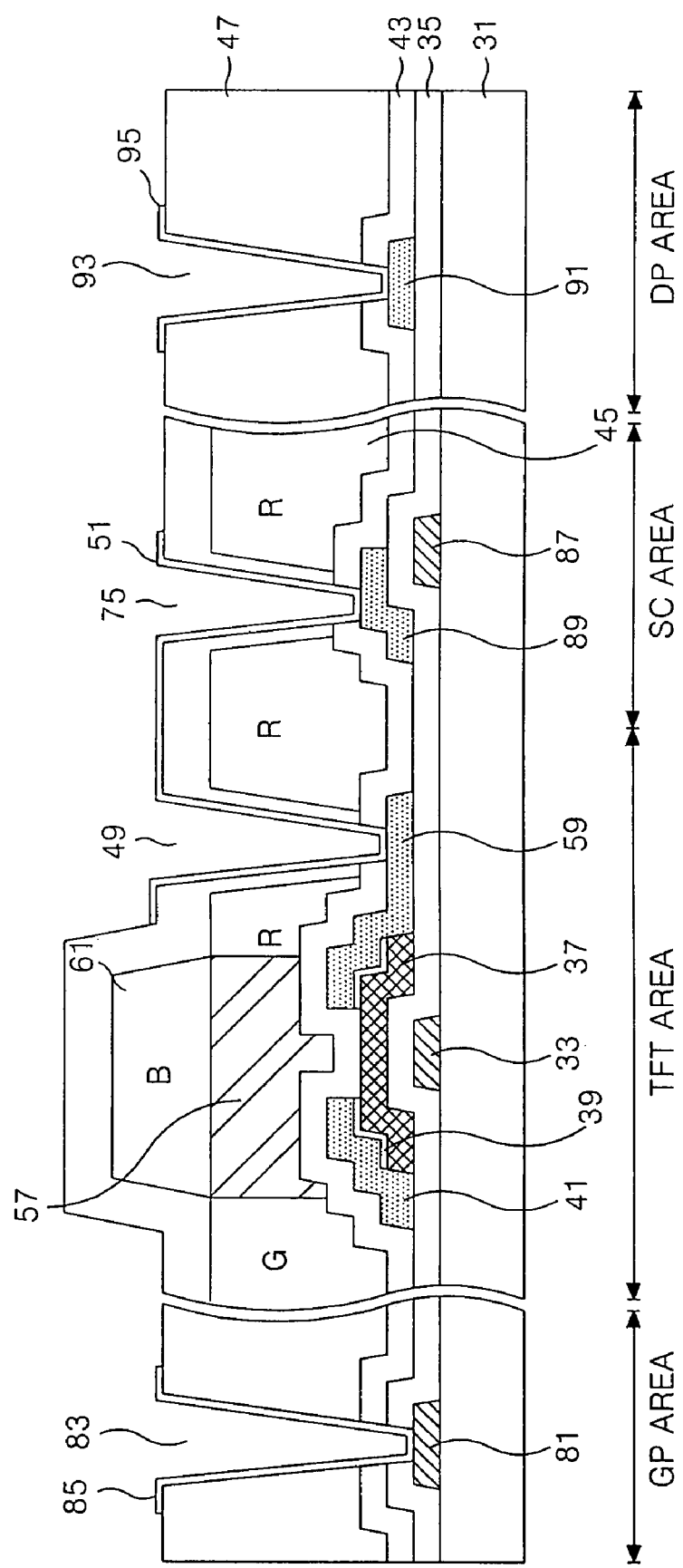

Next, as shown in FIG. 2G, a transparent conductive material such as indium-tin-oxide ITO or indium-zinc-oxide IZO is disposed on the second protective film 47 and patterned by photolithography, thereby forming a third conductive pattern group including the pixel electrode 51, the gate pad upper electrode 85 and the data pad upper electrode 95.

Figure 2H:
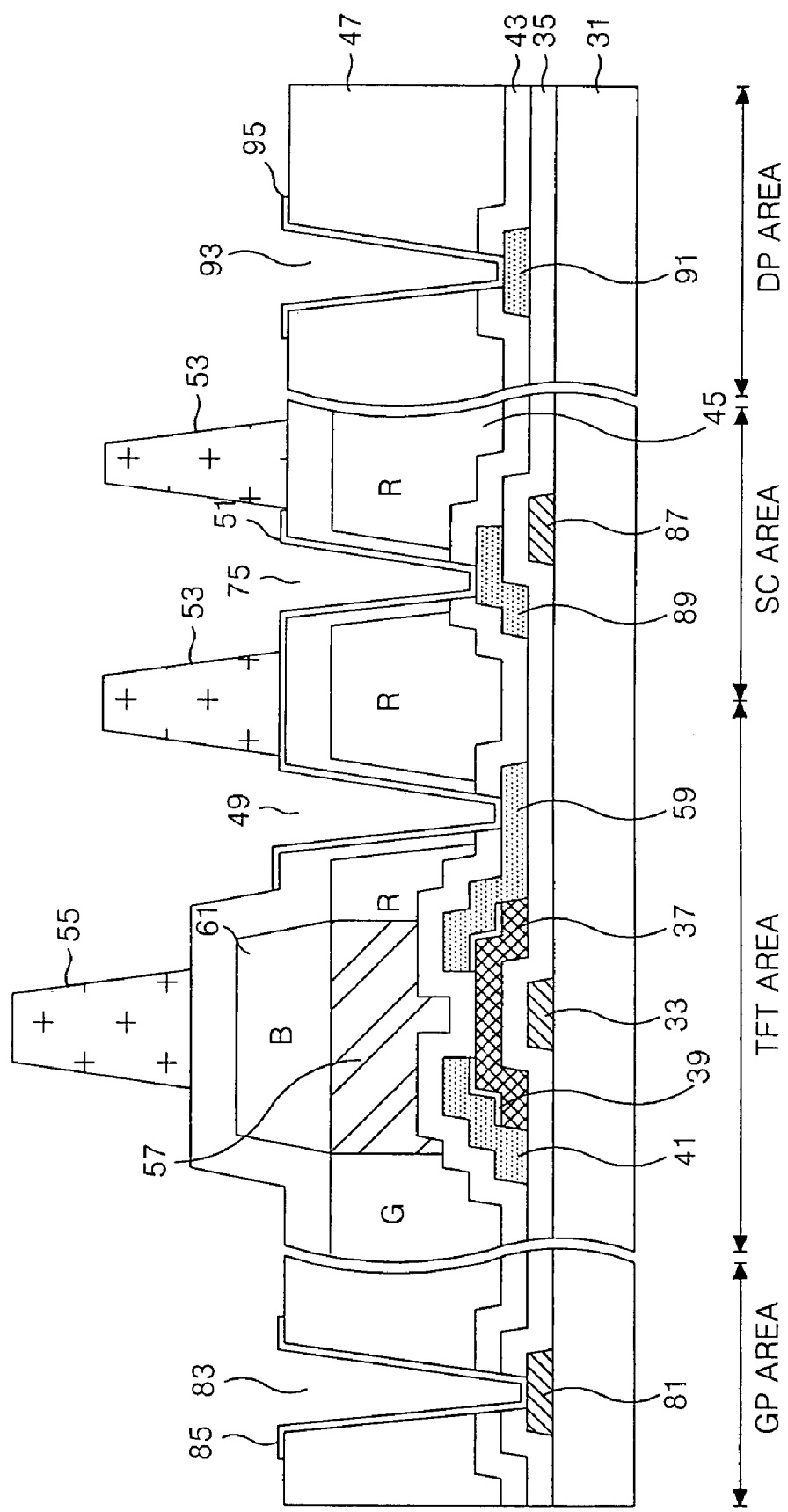

Next, as shown in FIG. 2H, a photo-sensitive organic insulating material is disposed on the lower substrate 31 where the third conductive pattern group is formed. The photo-sensitive organic insulating material layer disposed over the thin film transistor and over the pixel area forms a stepped difference. The photo-sensitive organic insulating material is patterned by the similar mask process, (i.e., exposure and development), thereby forming the spacer 55 and rib 53.

Figure 3:
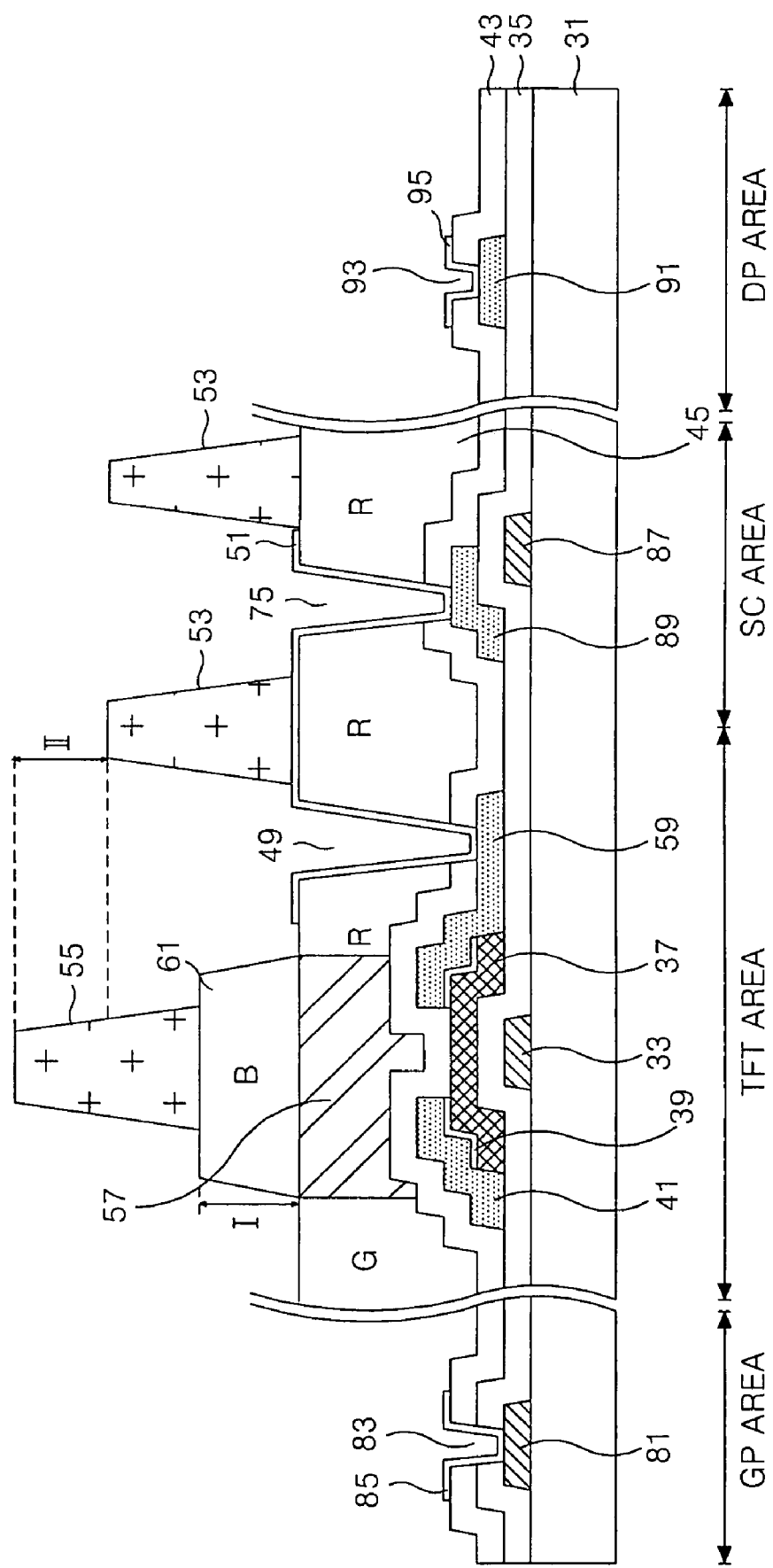
FIG. 3 is a cross-sectional view representing a lower array substrate of a liquid crystal display device according to a second exemplary embodiment of the present invention.

FIG. 3 is a cross-sectional view of a liquid crystal display according to a second exemplary embodiment of the present invention.

A liquid crystal display according to the second exemplary embodiment of the present invention has the same structure as that of the first exemplary embodiment of FIG. 1 except that the second protective film 47 is not used. According to such a structure, the pixel electrode 51 is formed to contact directly with the color filter 45, and the spacer 55 is formed on the dummy color filter 61 within the area of the light shielding layer 57. Accordingly, it is required to use a color filter 45 material having a high chemical resistance to a development, an etching and a PR peeling solutions when forming the pixel electrode 51. Furthermore, the color filter 45 is formed to have a thickness of around 2 μm or above to minimize an amount of component that can cause a contamination in the alignment film (not shown) or the liquid crystal material.

The liquid crystal display according to the second exemplary embodiment of the present invention, a first stepped difference I is defined as the height difference of the dummy color filter 61 and the color filter 45, and a second stepped difference II is defined as the height difference of the spacer 55 and the rib 53. In this case, if the height of the rib 53 is higher, an alignment defect and a light leakage can be generated, thus the first stepped difference I is increased to minimize the alignment defect by reducing the height of the rib (i.e., rib=the cell gap−the second stepped difference).

Figure 4A:
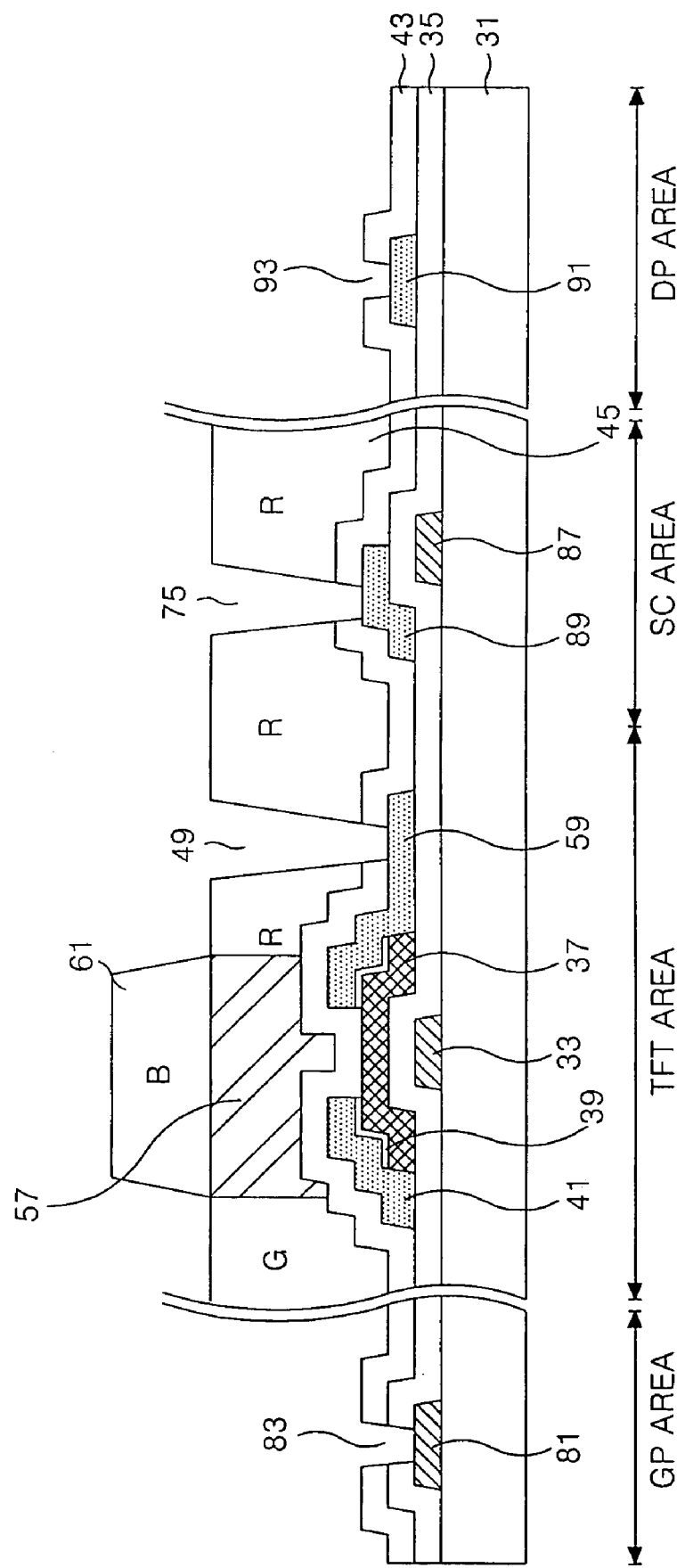
FIGS. 4A to 4C are cross-sectional views representing a fabricating method of the lower array substrate of the liquid crystal display device of FIG. 3.
Figure 4B:
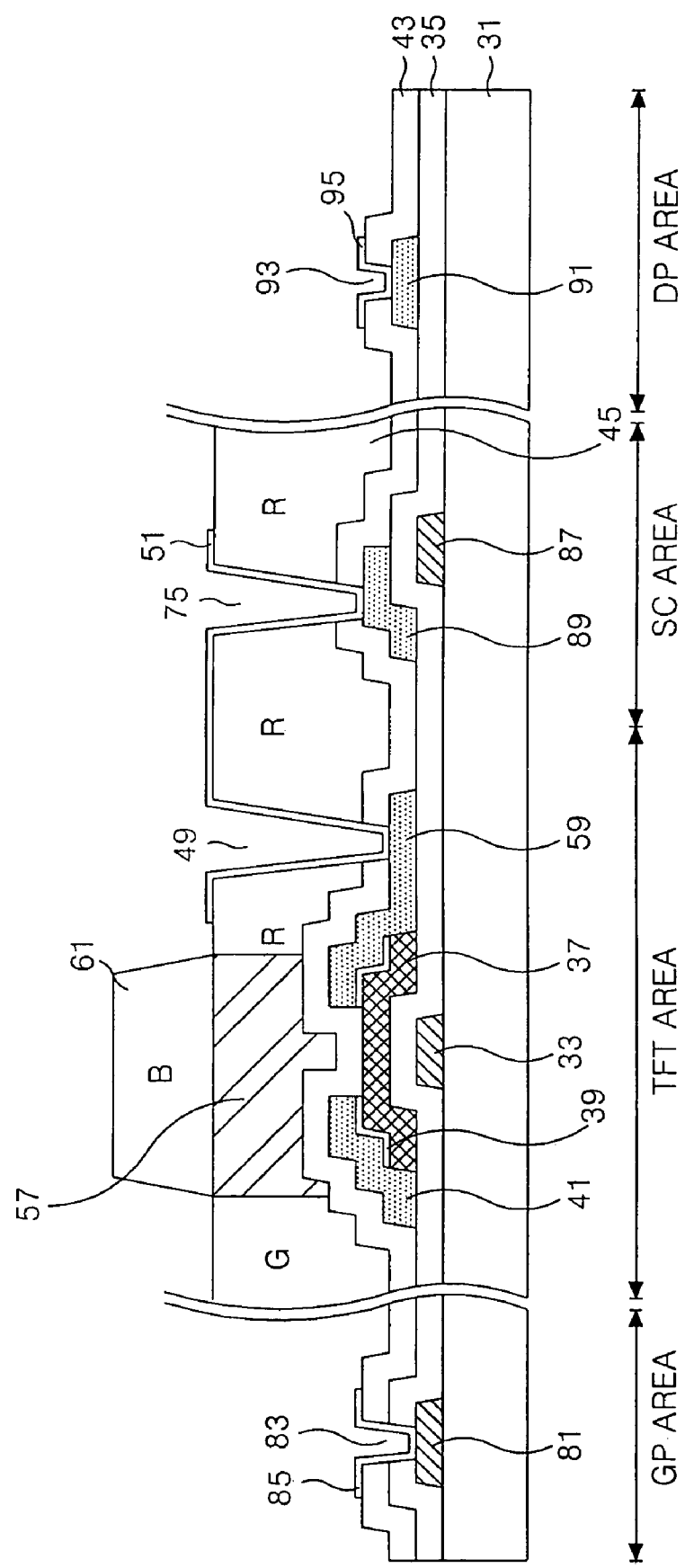
Figure 4C:
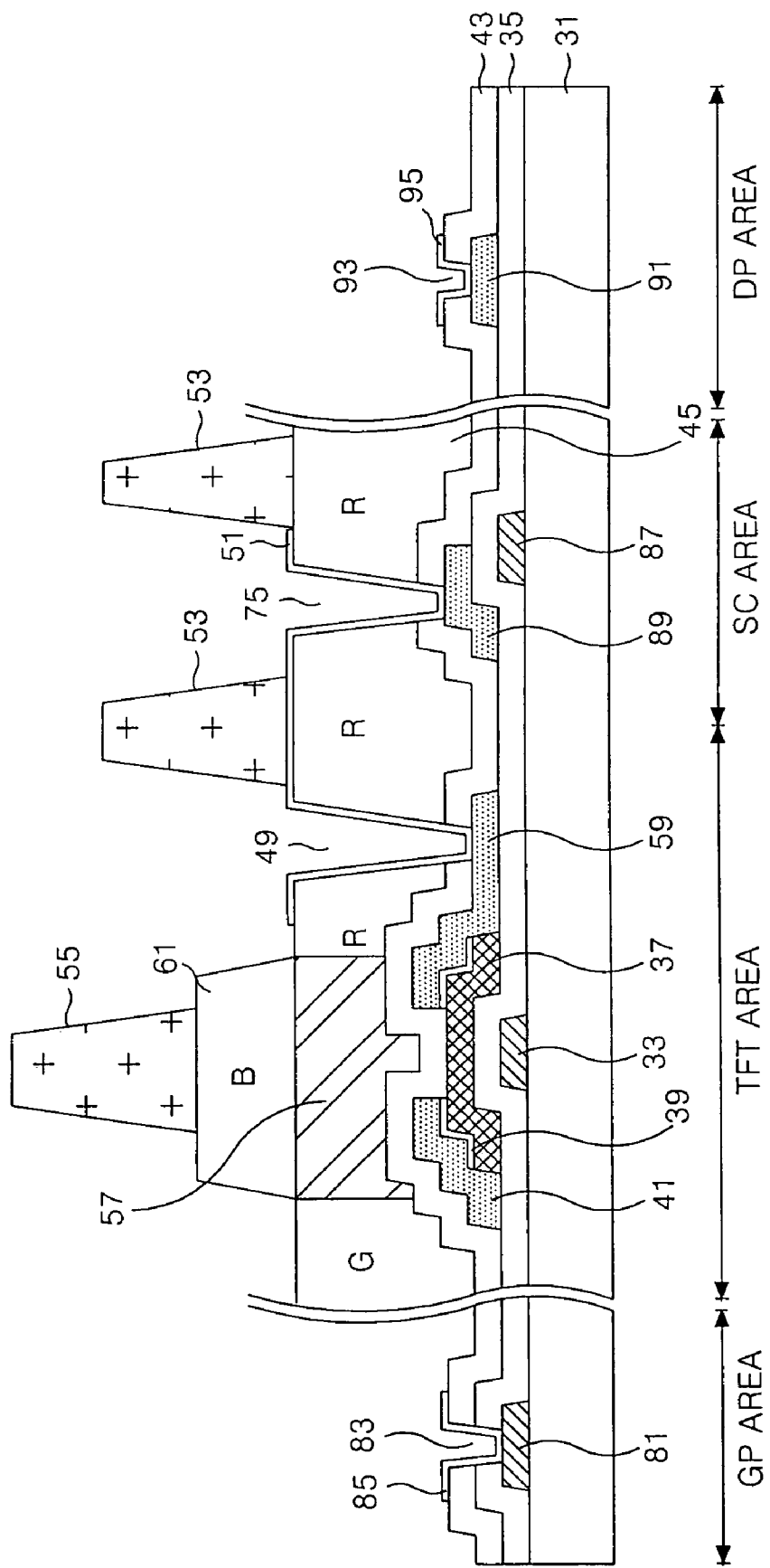

FIGS. 4A to 4C are cross-sectional view illustrating a fabricating method of the liquid crystal display according to the second exemplary embodiment of the present invention. The fabricating method of the liquid crystal display according to the second exemplary embodiment of the present invention has the same fabricating process from FIG. 2A to 2E, thus fabricating processes of the third exemplary embodiment will be described from the FIG. 2E forward.

As shown in FIG. 4A, the color filter 45 and the dummy color filter 61 are formed of an organic insulating film at the pixel area. The color filter 45 is formed on the first protective film 43 and the dummy color filter 61 is formed on the light shielding layer 57. Specifically, the color filter 45 is formed of an organic material having a good chemical property to protect the color filter from being damaged while forming the pixel electrode 51.

As shown in FIG. 4B, a transparent conductive material is disposed on the color filter 45, and then the transparent conductive material is patterned by photolithography process and etching process, thereby forming the pixel electrode 51, the gate pad upper electrode 85 and the data pad upper electrode 95.

Thereafter, as shown in FIG. 4C, the spacer 55 and the rib 53 are formed on the pixel electrode 51 and the color filter 45 of the thin film transistor, thereby completing the liquid crystal display according to the second embodiment of the present invention.

According to the above-described composition, the difference in height of the stepped differences I and II is influenced by the presence of the light shielding layer 57 and the dummy color filter 61. The stepped difference II of the spacer 55 and the rib 53 can be increased in accordance with the structure of the instant liquid crystal display device to prevent the occurrence of the alignment defect and the light leakage.

FIG. 5 is a cross-sectional view representing a thin film transistor array substrate according to a third exemplary embodiment of the present invention.

Referring to FIG. 5, the thin film transistor array substrate according to the third exemplary embodiment of the present invention prevents the generation of light leakage current at the channel portion by disposing the dummy color filter 61 of the adjacent pixel on the color filter 45 of the instant pixel. Instead of the light shielding layer 57 of FIG. 1, the dummy color filter 61 is directly formed on the color filter 45. The color filter 45 can include any one of red, green and blue color filters corresponding to the instant pixel, and the dummy color filter 61 can include a color corresponding to the adjacent pixel which is the color not used in the instant pixel. For instance, if the color filter 45 of the instant pixel is red color, then, the color of the dummy color filter 61 corresponding to the adjacent pixel is either green or blue color. The color filter 45 and the dummy color filter 61 can be formed by appropriate mask processes simultaneously, thus a process of forming a separate light shielding layer 57 of FIG. 1 can be omitted, thereby reducing the fabricating process of the whole liquid crystal display.

On the other hand, if the color filter 45 and the dummy color filter 61 are sequentially disposed and the effect of shielding light is not sufficient, a separate light shielding layer is further included in the upper substrate facing the dummy color filter 61.

Figure 6:
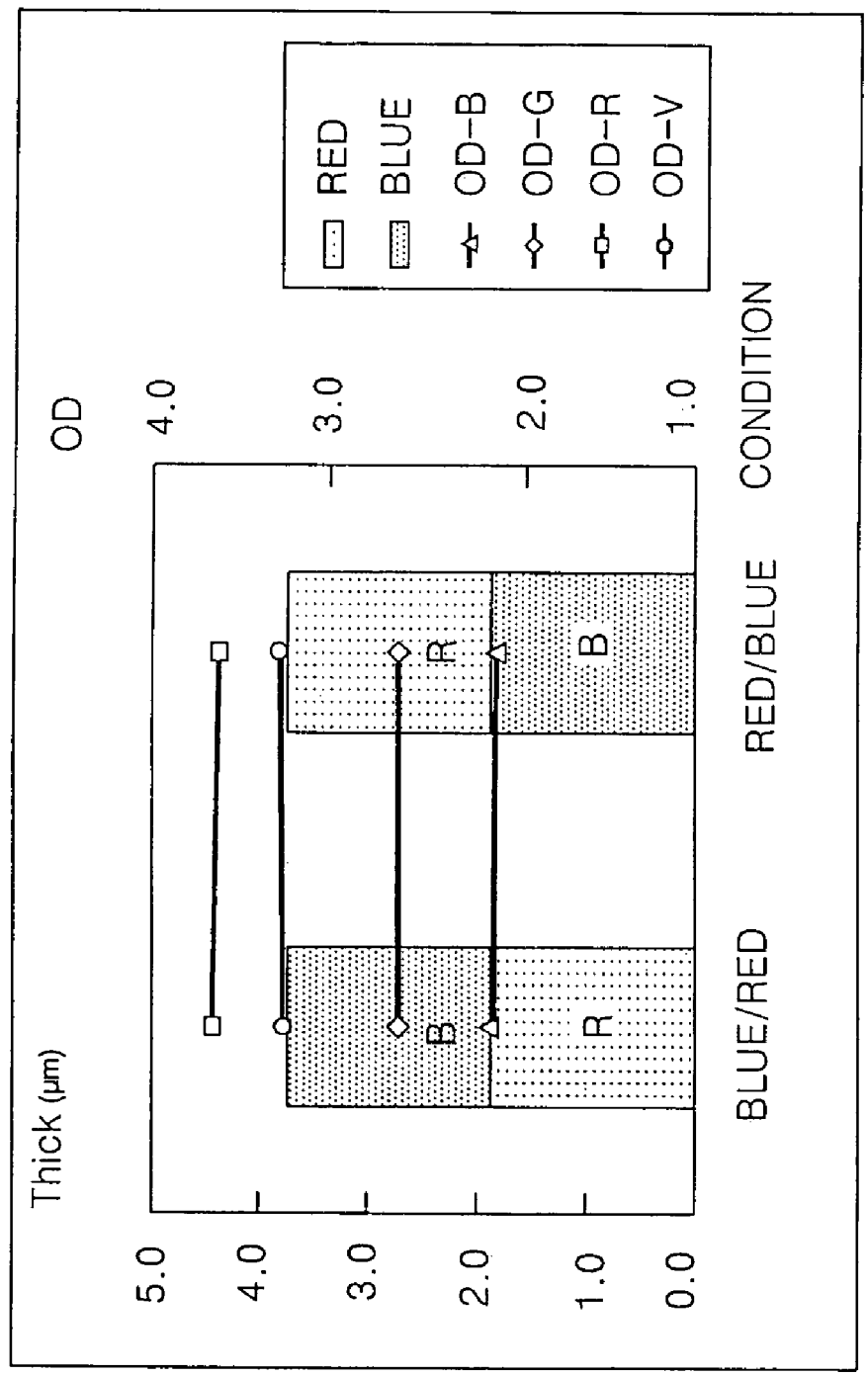
FIG. 6 is a table of density of light measuring the color filter and a dummy color filter layers of FIG. 5 disposed in sequence.

FIG. 6 is a table illustrating the density of light. The density of light is measured by equipment, such as X-Rite 3017, when the color filter realizing different colors is deposited in at least two layers. Referring to FIG. 6, when the red color filter and the blue dummy color filter of the same thickness are sequentially disposed or the blue color filter and the red dummy color filter are sequentially disposed to make the total thickness 3.5 µm or above, density of light result in as follows. The light density OD-V, OD-R of the red wavelength range and the visual area is 3.0 or above, the light density OD-G of the green wavelength range is 3.0 (transmissivity 0.1%) to have a light shielding effect and the light density OD-B of the blue wavelength range is 2.0 (transmissivity 1%). Furthermore, combination of the color filter of one color and the dummy color filter of another color, or increased thickness of each filters can be used to evenly intercept the light in the visual area, thereby realizing the light density at the level of 3.0.

On the other hand, in the third exemplary embodiment of the present invention, it is illustrated that two layered color filters 45, 61 are formed on the thin film transistor. By implementing this structure, the effect of preventing the generation of the light leakage current at the channel portion of the thin film transistor is increased. Also, the stepped difference II of the spacer 55 and the rib 53 increases further, thus it may further reduce the alignment defect and the light leakage of the liquid crystal.

Figure 7A:
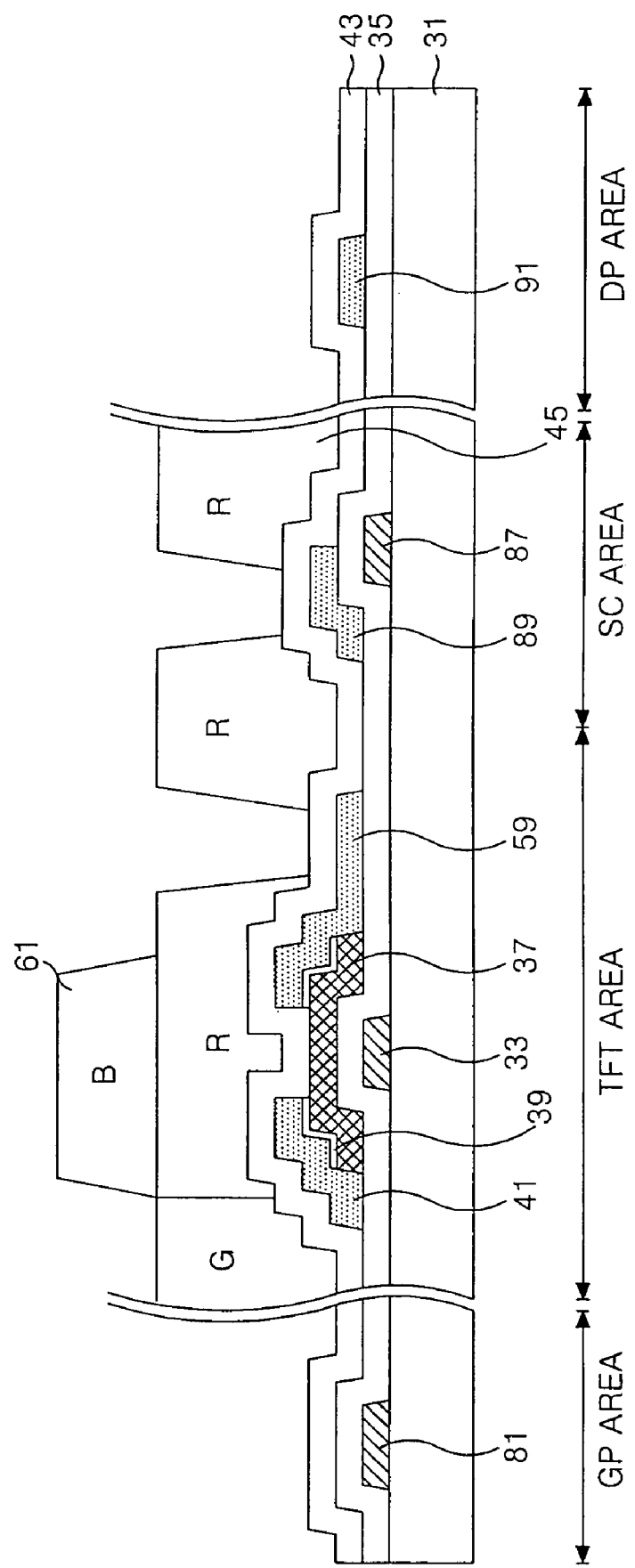
FIGS. 7A to 7D are cross-sectional views representing a fabricating method of the lower array substrate of the liquid crystal display device of FIG. 5.
Figure 7B:
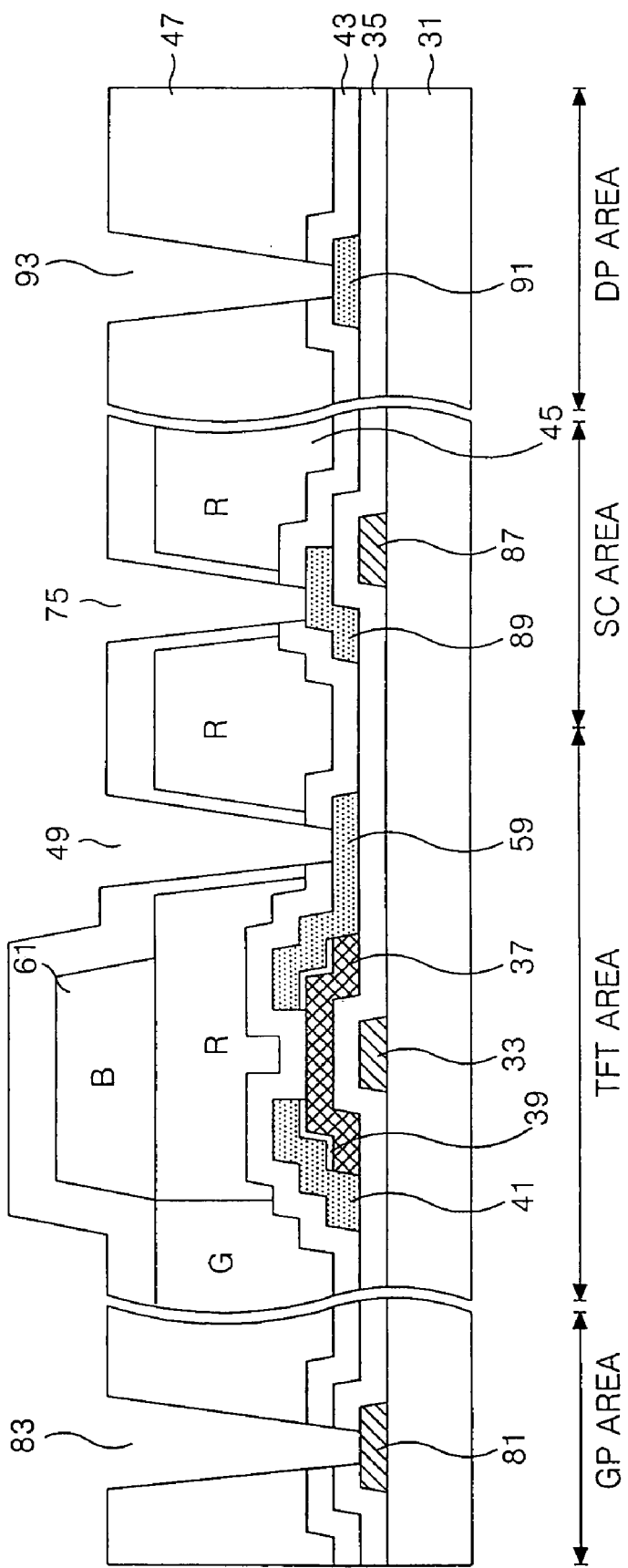

FIGS. 7A to 7B are cross-sectional views illustrating the fabricating method of the liquid crystal display according to the third exemplary embodiment of the present invention. The fabricating method of the third exemplary embodiment is the same method as that of the first embodiment of the present invention from FIG. 2A to 2C. Accordingly, the detailed description of the fabrication method will be explained from the FIG. 2C forward.

As shown in FIG. 7A, an inorganic insulating material such as silicon nitride or silicon oxide is disposed on the lower substrate 31 where the second conductive pattern group is formed, thereby forming a first protective film 43. And, a photo-sensitive material that can filter any light of one color, red R, green G and blue B color, is disposed on the first protective film 43. At this time, the photo-sensitive material is dedicated to one of the red R, green G, and blue B, and is patterned by exposure and development to remain at the thin film transistor area and a pixel area, thereby forming the color filter 45. Thereafter, a photo-sensitive material that can filter light of any colors which is not used in the immediate preceding process, is disposed on the color filter 45. The photo-sensitive material on the patterned color filter 45 is patterned by exposure and development to remain at the adjacent thin film transistor area (not shown) and a pixel area (not shown), thereby forming the dummy color filter 61 having a different color from the color of the instant color filter 45. Thus, a stepped difference I is made between the thin film transistor are and the pixel area by the dummy color filter 61.

Figure 7C:
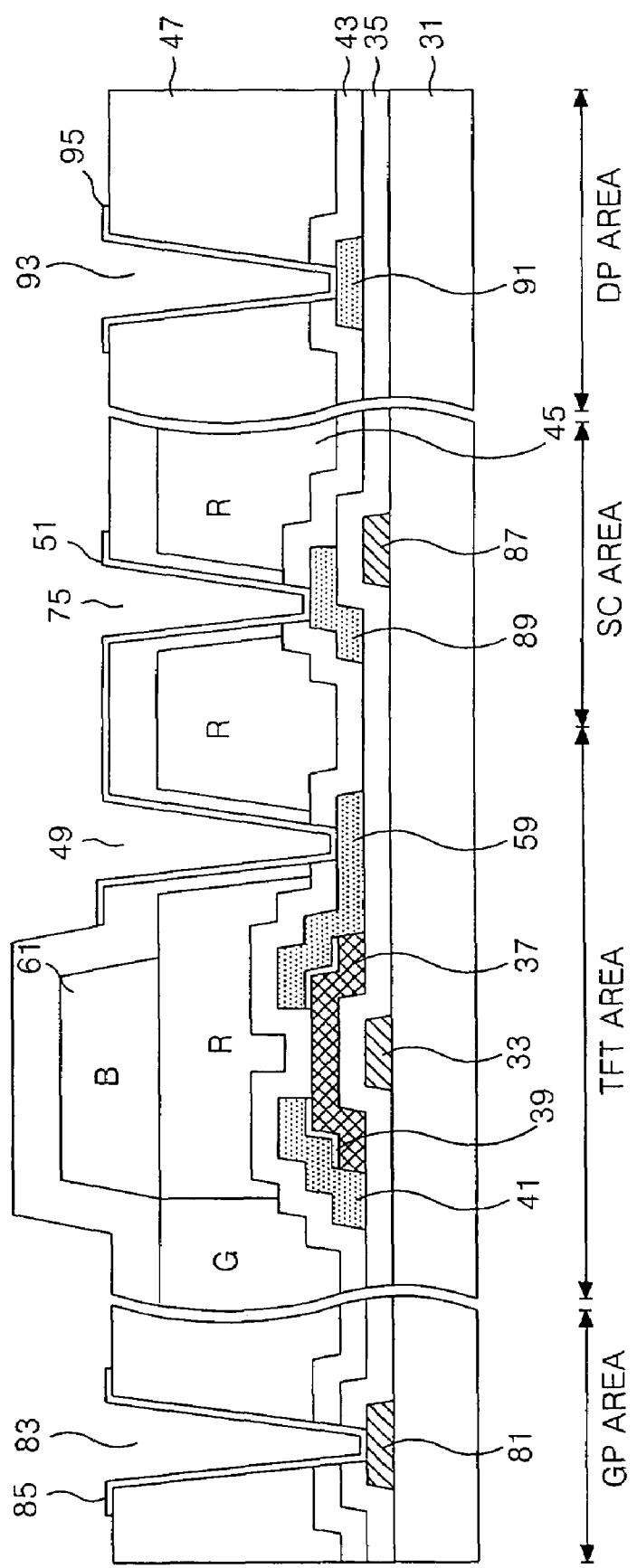

As shown in FIG. 7B. an organic insulating film including acrylic resin or BCB is coated on the color filter 45 and the dummy color filter 61, thereby forming a second protective film 47. The second protective film 47 and the first protective film 43 are sequentially patterned by photolithography to define fist to fourth contact holes 49, 75, 83, and 93. Thereafter, as shown in FIG. 7C, a transparent conductive material such as indium-tin-oxide ITO or indium-zinc-oxide IZO is disposed on the second protective film 47 and patterned to form a third conductive pattern group including the pixel electrode 51, the gate pad upper electrode 85 and the data pad upper electrode 95.

Figure 7D:
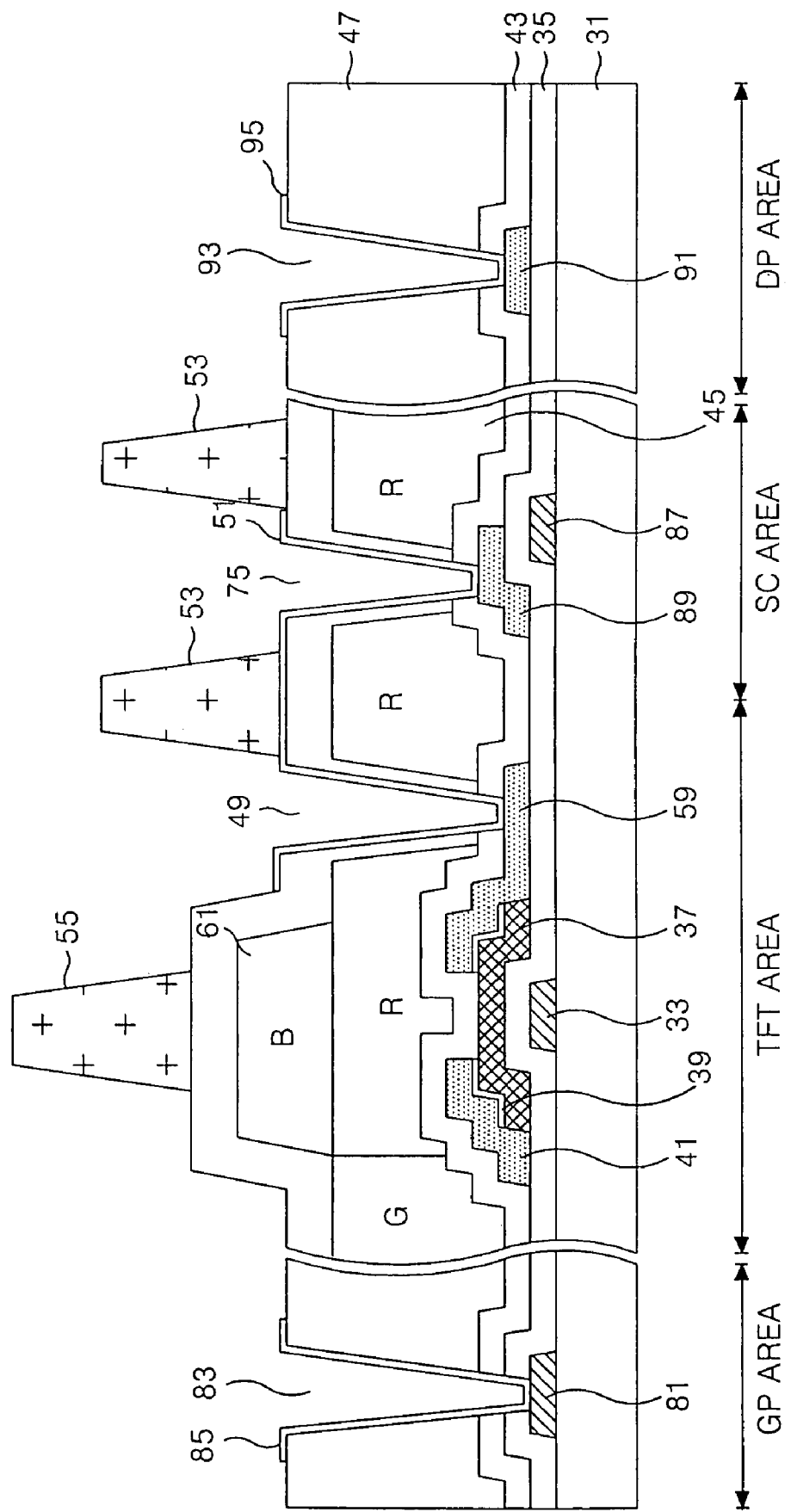

Lastly, as shown in FIG. 7D, the photo-sensitive organic material is disposed on the second protective film 47 where the third conductive pattern group is formed, and the photo-sensitive organic material is patterned to form the spacer 55 and the rib 53, thereby forming the liquid crystal display according to the third exemplary embodiment of the present invention.

In the liquid crystal display structure according to the third exemplary embodiment of the present invention, the dummy color filter 61 formed on the color filter 45 of the thin film transistor area has a different stepped difference from the pixel area. Therefore, the stepped difference II of the spacer 55 and the rib 53 can be increased to reduce the alignment defect and the light leakage of the liquid crystal material. In addition, the fabricating process is reduced since the light shielding layer 57 is not formed as described in the first embodiment.

Figure 9:
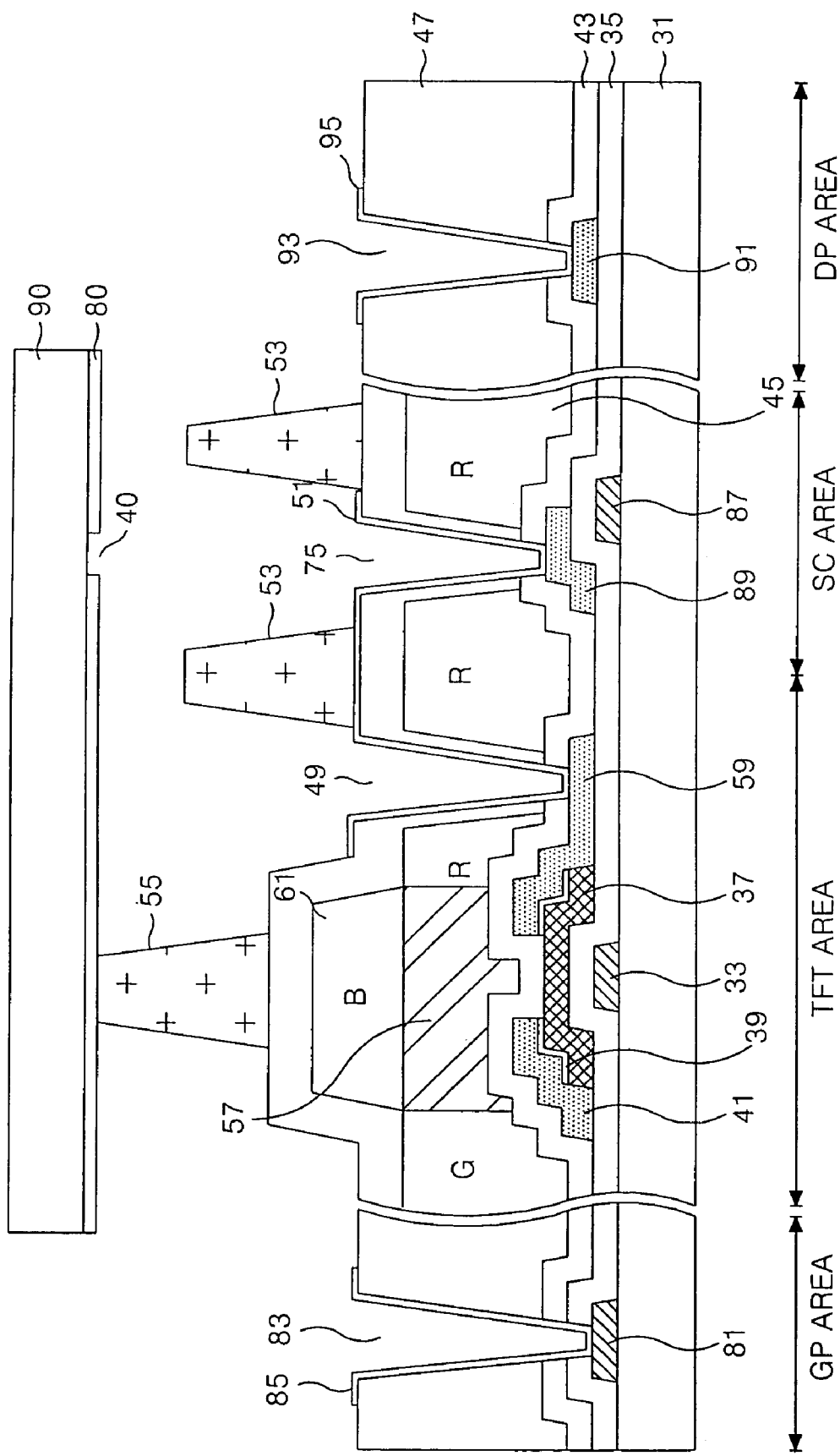
FIG. 9 is a cross-sectional view representing another shape of the liquid crystal display including the lower array substrate according to the first to third exemplary embodiments of the present invention.

FIGS. 8 and 9 are cross-sectional views representing the liquid crystal display according to the first to third exemplary embodiments of the present invention.

The common electrode 80 is disposed on the upper substrate 90 shown in FIG. 8. The liquid crystal material is interposed between the upper substrate 90 and the lower substrate 31, and the rib 53 controls the arrangement direction of the liquid crystal material.

As shown in FIG. 9, the common electrode 80 is disposed on the upper substrate 90 having a slit 40. The slit 40 is formed between the ribs 53. The liquid crystal material interposed between the upper substrate 90 and the lower substrate 31 has its arrangement direction controlled by the rib 53 and the slit 40.

Accordingly, the present invention forms the stepped difference at the thin film transistor area and the pixel area, which simplifies the fabricating process because the spacer and the rib can be formed in the same process.

It will be apparent to those skilled in art that various modifications and variations can be made in the liquid crystal display and fabrication method thereof of the present invention without departing from the spirit or scope of the invention. Thus, it is intended that the present invention cover the modifications and variations of this invention provided they come within the scope of the appended claims and their equivalents.

What is claimed is:

1. A liquid crystal display panel, comprising:
    a gate line disposed on a substrate;
    a data line disposed on the substrate, a pixel area being defined by an intersection of the gate line and the data line;
    a thin film transistor located at the intersection of the gate line and the data line;
    a first color filter disposed on the substrate in a pixel area;
    a light shielding layer formed on the thin film transistor so that the height of an upper surface of the light shielding layer is the same as that of an upper surface of the first color filter;
    a dummy color filter formed on the light shielding layer;
    a spacer formed on the dummy color filter; and
    a rib formed on the first color filter.

2. The liquid crystal display panel according to claim 1, wherein a color of the dummy color filter is different from that of the first color filter.

3. The liquid crystal display panel according to claim 1, further comprising an organic protective film formed between the spacer and the dummy color filter and the rib and the first color filter.

4. The liquid crystal display panel according to claim 1, wherein the spacer is formed of a material identical to that of the rib.

5. A fabricating method of a liquid crystal display panel, comprising the steps of:
    forming a thin film transistor on a substrate;
    disposing a first protective film to protect the thin film transistor;
    forming a light shielding layer on the first protective film, wherein the light shielding layer overlaps the thin film transistor;
    forming a first color filter on the first protective film in a pixel area so that the height of an upper surface of the first color filter is the same as that of an upper surface of the light shielding layer;
    a dummy color filter on the light shielding layer;
    forming a pixel electrode connected to the thin film transistor; and
    forming a spacer on the dummy color filter and a rib on the first color filter by using a same mask, wherein the rib controls the arrangement direction of a liquid crystal material.

6. The fabricating method according to claim 5, further comprising the step of disposing a second protective film to cover the dummy color filter and the first color filter.

7. The fabricating method according to claim 5, wherein the dummy color filter includes a color filter material of any one of red, green and blue color.

8. The fabricating method according to claim 5, wherein the dummy color filter includes the color filter material having a color different from a material of the first color filter.

* * * * *